(12) United States Patent
Watanabe et al.

(10) Patent No.: US 8,978,215 B2
(45) Date of Patent: Mar. 17, 2015

(54) METHOD OF MANUFACTURING PIEZOELECTRIC ACTUATOR

(75) Inventors: Satoshi Watanabe, Chiba (JP); Tatsuro Sato, Chiba (JP); Kazuo Tani, Chiba (JP); Yoko Shinohara, Chiba (JP)

(73) Assignee: Seiko Instruments Inc. (JP)

( * ) Notice: Subject to any disclaimer, the term of this patent is extended or adjusted under 35 U.S.C. 154(b) by 3902 days.

(21) Appl. No.: 09/822,151

(22) Filed: Jun. 21, 2001

(65) Prior Publication Data

US 2001/0039703 A1    Nov. 15, 2001

(51) Int. Cl.
*H04R 17/00* (2006.01)
(52) U.S. Cl.
USPC .................................. 29/25.35; 413/414
(58) Field of Classification Search
USPC .......... 29/25.35, 412–417; 156/250; 310/311, 310/348, 351, 353
See application file for complete search history.

(56) References Cited

U.S. PATENT DOCUMENTS

| | | | | |
|---|---|---|---|---|
| 4,012,648 | A * | 3/1977 | Engdahl | 29/25.35 |
| 4,445,256 | A * | 5/1984 | Huguenin et al. | 174/50.54 |
| 4,514,247 | A * | 4/1985 | Zola | 156/250 |

* cited by examiner

*Primary Examiner* — Gregory L. Huson
*Assistant Examiner* — Peter deVore
(74) *Attorney, Agent, or Firm* — Adams & Wilks

(57) ABSTRACT

In a method of manufacturing piezoelectric actuators, a vibrating body plate supporting vibrating bodies at vibrational nodes thereof and a moving body plate having moving bodies are provided. Each of the vibrating bodies has a vibrator and a piezoelectric body mounted on the vibrator. The vibrating body plate and the moving body plate are stacked over one another to provide a piezoelectric actuator assembly. The piezoelectric actuator assembly is then cut at the vibrational nodes of the vibrating bodies to provide individual piezoelectric actuators.

12 Claims, 10 Drawing Sheets

PRIOR ART

PRIOR ART

METHOD OF MANUFACTURING PIEZOELECTRIC ACTUATOR

FIELD OF THE INVENTION

Background of the Invention

The present invention relates to a method of manufacturing piezoelectric actuators used in devices such as watches, clocks, cameras, printer, and information storage devices.

BACKGROUND INFORMATION

A piezoelectric body produces a distortion when an electrical input is applied. This is referred to as the inverse piezoelectric effect. Features of this piezoelectric body include high output, high response, and non-magnetism. A high-output actuator can be fabricated using a piezoelectric body.

In the past, components of piezoelectric actuators have been machined and assembled one by one by etching or using an NC (numerical control) machine or the like. A specific known example of such a piezoelectric actuator is a piezoelectric micromotor (The Institute of Electrical Engineers of Japan, 15th Sensor Symposium, *TECHNICAL DIGEST*, pp. 181-184, 1997). FIG. 2 is an assembly view of this piezoelectric micromotor. This piezoelectric micromotor comprises a disc-like moving body 4 having a salient axial portion and a base chassis 17 holding a vibrating body 3 and the salient shaft portion. The vibrating body 3 has three bending-and-displacement mechanisms 18, each being constructed of a piezoelectric body 1 producing expanding and contracting motions, the piezoelectric body 1 being stuck to a vibrator 2. Each bending-and-displacement mechanism 18 assumes an L-shaped form. The end of the shorter side of this L-shaped mechanism is fixedly mounted to the center portion of the base chassis 17. The bending-and-displacement mechanisms 18 are placed parallel to the tangential direction of the moving body 4. This moving body 4 has a sliding portion. The vibrator 2 is fabricated by etching or other process. FIG. 3 illustrates the principle of operation of this piezoelectric micromotor. When an exciting voltage of a certain frequency is applied to the piezoelectric body 1, this piezoelectric body 1 expands and contracts. This bends and vibrates the vibrator 2 as shown in FIG. 3. As the vibrator 2 vibrates, the front end of the vibrator 2 makes contact with the moving body 4. As a result of the combination of the vertical and lateral force components, the moving body 4 is moved.

Since the conventional piezoelectric actuators have been assembled one by one, the productivity is associated with problems. Additionally, fabrication costs have been high. Microdevices fabricated by combining microparts are quite small and so it is necessary that a large number of microdevices be incorporated into one finished product. Therefore, there is a need for a technique for manufacturing a large number of microdevices at a time by batch processing rather than fabricating small-sized products one by one.

Therefore, a great number of parts have been fabricated in a short time by etching or other techniques. Where etching or other similar technique is used, it is possible to mass-produce microparts on one plate. However, it is necessary to establish procedures for separating them into desired shapes and for efficiently assembling the microparts.

FIG. 13 is a top plan view showing one example of cutting of the connector portion of the vibrating body 3. The vibrating body 3 is completely mounted fixedly at a stationary portion 12. Where a connector portion 8 is cut by dicing technology, for example, it is severed along a cut portion 10. Unfortunately, a protruding portion such as a burr 11 is produced. Even if an accurate machining operation is carried out, a minute burr 11 will be formed.

Dicing technology, laser processing, etching, and other technologies have been available as methods of separating individual components as described above. With any technique, there arises the problem that formation of burrs or dimples results. Therefore, a burr left on the vibrator may drag along the moving body, or the burr may add to the mass, thus affecting the amplitude of the vibration. This may deteriorate the driving performance.

Where a method of forcedly plastically deforming or cutting the material such as a punch is used, force is applied to the vibrator. This may deform the vibrator.

Especially, a piezoelectric actuator makes use of a resonance phenomenon. The resonance frequency may be varied according to the accuracy of the vibrator parts. Consequently, in order to offer uniform driving performance, the machining operation must be performed and the actuator must be designed such that improved accuracy is obtained or the resonance phenomenon is affected less.

SUMMARY OF THE INVENTION

In view of the foregoing, the present invention has been made. It is an object of the present invention to provide a method of efficiently manufacturing desired piezoelectric actuators having vibrating bodies whose vibrational characteristics are affected less by the machining accuracy than heretofore and thus the driving characteristics of the piezoelectric actuators are affected less.

In a method of manufacturing piezoelectric actuators in accordance with the present invention, a vibrating body plate having at least one vibrating body and a moving body plate having at least one moving body are stacked on top of each other, the vibrating body having a resilient body to which a piezoelectric body is stuck. Thus, a piezoelectric actuator assembly is fabricated. This piezoelectric actuator assembly is cut into separate piezoelectric actuators, thus taking out the piezoelectric actuators.

In this method, the moving body plate having plural members and the vibrating body plate constructed of the resilient body to which the piezoelectric body is stuck are stacked on top of each other to constitute the piezoelectric actuator assembly. This piezoelectric actuator assembly is separated into individual piezoelectric actuators. Consequently, plural piezoelectric actuators can be fabricated in one process step. In this way, the efficiency of the fabrication can be improved. Furthermore, the quality can be made more uniform than where individual components are assembled, because the individual actuators are assembled and separated under the same conditions.

The piezoelectric body can be made of lead zirconate titanate, barium titanate, lithium niobate, lithium tantalate, or the like. The resilient body can be made of iron, stainless steel, aluminum, beryllium copper, or other metal. As a separation method, dicing technology, laser processing, etching, or other method can be used. The piezoelectric body and the resilient body can be adhesively bonded together, brazed together, coupled together, or can be directly fabricated. Furthermore, other technologies may be employed.

In a method of fabricating piezoelectric actuators in accordance with the present invention, a vibrating body plate having at least one vibrating body constructed of a resilient material to which a piezoelectric material is stuck, a moving body plate having at least one moving body, and a pressure application member plate having at least one pressure application member for applying pressure to the vibrating body and to the moving body are stacked on top of each other to thereby constitute a piezoelectric actuator assembly. This piezoelectric actuator assembly is cut into separate piezoelectric actuators. As a result, the piezoelectric actuators are taken out.

With this method, the pressure application member plate having the pressure application member is stacked. The piezoelectric actuators are constituted and separated. The individual piezoelectric actuators are then separated. Thus, a structure for applying appropriate pressure to the moving body and to the vibrating body to move the moving body can be fabricated. In consequence, desired piezoelectric actuator driving characteristics can be obtained.

In a method of fabricating piezoelectric actuators in accordance with the present invention, a vibrating body plate having at least one vibrating body constructed of a resilient body to which a piezoelectric body is stuck is prepared, and the vibrating body is separated from the vibrating body plate connected with the vibrating body at connector portions formed at vibrational nodes of the vibrating body. Then, the vibrating body and the moving body are stacked on top of each other. Thus, piezoelectric actuators are manufactured.

With this method of fabricating piezoelectric actuators, each vibrating body is supported at vibrational nodes within the plane of the vibrating body plate. After the vibrating body plate and the moving body plate have been stacked on top of each other, or after the vibrating body plate, the moving body plate, and the pressure application member plate have been stacked on top of each other, the vibrational nodes are severed. In this way, the effects of the vibrating body on the resonance phenomenon can be reduced. That is, the effects of the vibrational pattern of the vibrating body and of the resonance frequency can be reduced. In this manner, desired driving characteristics can be obtained.

If burrs are created by separation of individual components, they are at vibrational nodes. Therefore, they do not vibrate at large amplitudes and, therefore, do not affect the contact of the rotor. Effects of catching on the actuator driving characteristics can be eliminated.

In a further method of fabricating piezoelectric actuators in accordance with the present invention, a vibrating body plate having at least one vibrating body constructed of a resilient body to which a piezoelectric body is stuck is prepared, and the vibrating body is separated from the vibrating body plate connected with the vibrating body at connector portions formed at vibrational nodes of the vibrating body. Then, the vibrating body and the moving body are stacked on top of each other. Thus, piezoelectric actuators are manufactured.

In this way, the vibrating body cut at the connector portions formed at vibrational nodes and the moving body are stacked on top of each other. Thus, piezoelectric actuators are fabricated. Variations in shape among the vibrating bodies due to a separation step are reduced. The effects of the vibrating bodies on the resonance phenomenon can be decreased. Consequently, stable piezoelectric actuator driving characteristics can be derived.

In a method of fabricating piezoelectric actuators in accordance with the present invention, a vibrating body plate having at least one vibrating body constructed of a resilient body to which a piezoelectric body is stuck is prepared, and the vibrating body is separated from the vibrating body plate connected with the vibrating body at connector portions formed at vibrational nodes of the vibrating body. Then, the vibrating body, the moving body, and a pressure application member for applying pressure to the vibrating body and to the moving body are stacked on top of each other. Thus, piezoelectric actuators are manufactured.

This method produces the aforementioned effects. In addition, a structure for applying appropriate pressure to the vibrating body and to the moving body can be fabricated by stacking the pressure application member together with the vibrating body and the moving body. Thus, desired piezoelectric actuator driving characteristics can be obtained.

In a method of fabricating piezoelectric actuators in accordance with the present invention, a vibrator plate constructed of a resilient body and having at least one vibrator is connected with the vibrator at connector portions formed at vibrational nodes of the vibrating body formed where a piezoelectric body is stuck to the vibrator, and the vibrator is separated at the connector portions. A vibrating body constructed of the vibrator to which the piezoelectric body is stuck is formed. The vibrating body and a moving body are stacked on top of each other to thereby constitute piezoelectric actuators.

In this method, the vibrator plate having the vibrator has been previously so designed that its connector portions are placed at vibrational nodes of the vibrating body. After cutting off the vibrator, the vibrating body to which the piezoelectric body is stuck and the moving body are stacked on top of each other. Variations in shape among vibrating bodies due to a separation operation are reduced. The effects of the vibrating body on the resonance effect can be decreased. As a result, stable piezoelectric actuator driving characteristics can be derived.

In a method of fabricating piezoelectric actuators in accordance with the present invention, a vibrator plate constructed of a resilient body and having at least one vibrator is connected with the vibrator at connector portions formed at vibrational nodes of the vibrating body constructed of the vibrator to which a piezoelectric body is stuck, and the vibrator is separated at the connector portions. The vibrating body constructed of the vibrator to which the piezoelectric body is stuck is formed. The vibrating body, a moving body, and a pressure application member for applying pressure to the vibrating body and to the moving body are stacked on top of each other, thus manufacturing piezoelectric actuators.

This method produces the aforementioned effects. In addition, a structure for applying appropriate pressure to the vibrating body and to the moving body can be fabricated by stacking the pressure application member together with the vibrating body and the moving body. Thus, desired piezoelectric actuator driving characteristics can be obtained.

Each piezoelectric actuator in accordance with the present invention comprises a vibrating body constructed of a stationary portion whose one end is fixed and supported and an extension portion extending in the direction of movement of the moving body, the moving body for making contact with the vibrating body to move it, and a pressure application member for applying pressure to the vibrating body and to the moving body, and is characterized in that it is manufactured by any one of the aforementioned methods of manufacturing piezoelectric actuators.

With this fabrication method, a large number of piezoelectric actuators each comprising a vibrating body constructed of a stationary portion whose one end is fixed and supported and an extension portion extending in the direction of movement of the moving body, the moving body for making contact with the vibrating body to move it, and a pressure application member for applying pressure to the vibrating body and to the moving body can be fabricated in one process step. Hence, piezoelectric actuators can be manufactured efficiently.

DETAILED DESCRIPTION OF THE PREFERRED EMBODIMENTS

Methods of manufacturing piezoelectric actuators in accordance with the present invention are hereinafter described with reference to the accompanying drawings.

Embodiment 1

Embodiment 1 of the present invention is described in detail by referring to FIGS. 1, 4 to 8, and 12.

In Embodiment 1, an example is given in which a vibrating body plate, a moving body plate, and a pressure application member plate (if necessary) are stacked on top of each other to manufacture at least one piezoelectric actuator assembly and then piezoelectric actuators are separated to manufacture piezoelectric actuators.

Figure 12:
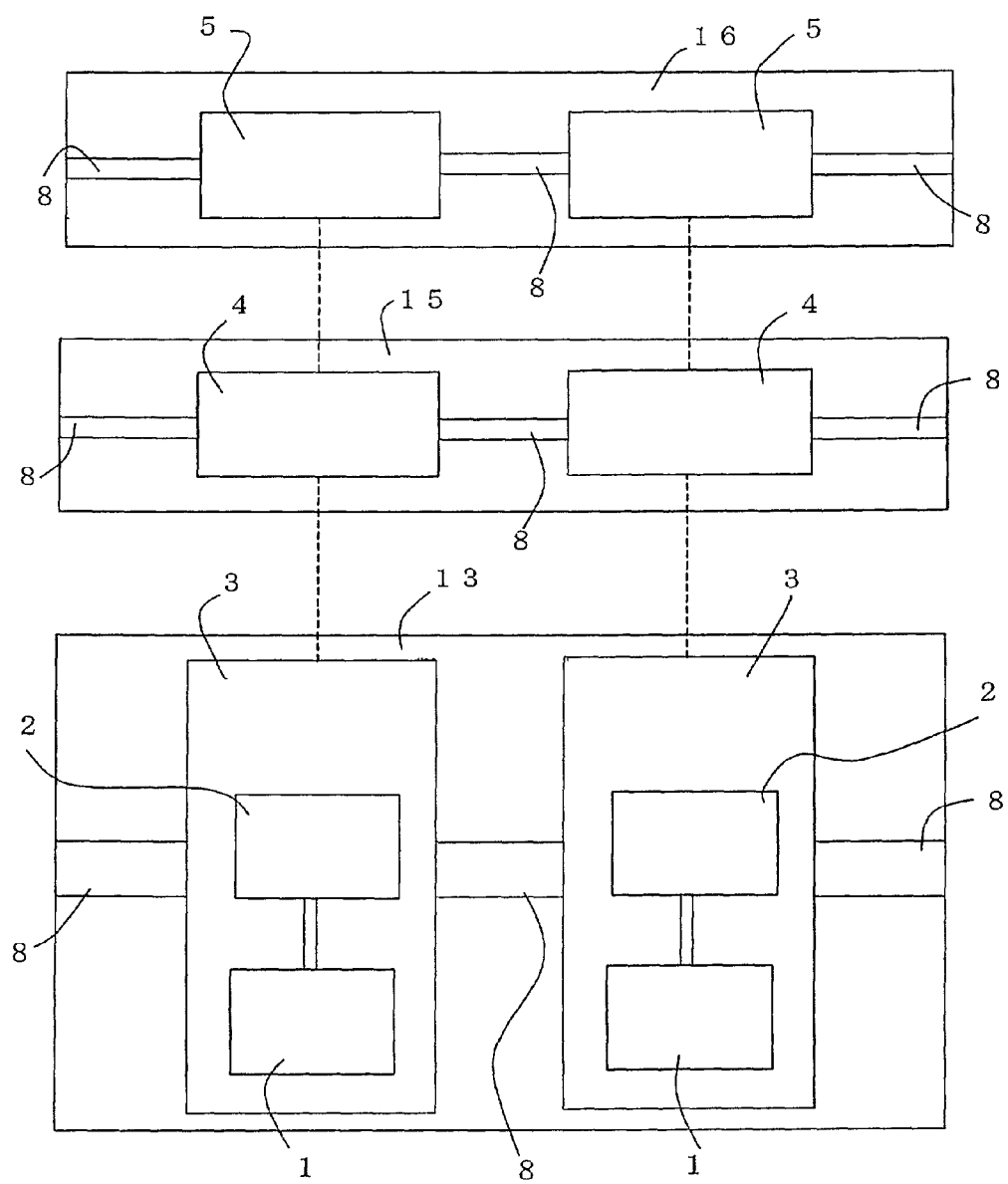
FIG. 12 is a block diagram of the second piezoelectric actuator assembly in accordance with Embodiment 1.
Figure 13:
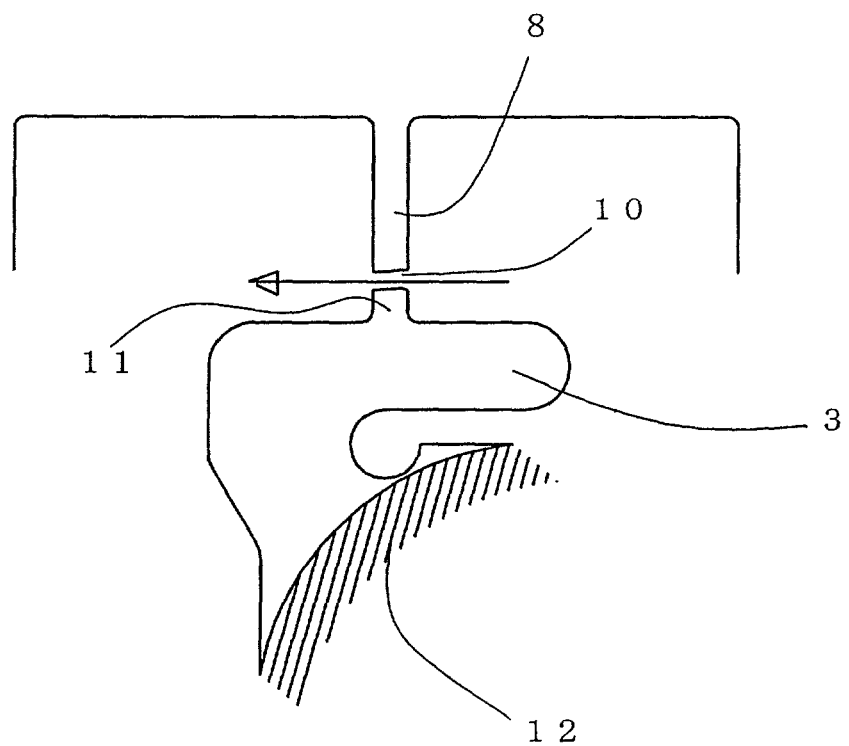
FIG. 13 is a top plan view showing one example of cutting of a connector portion of a vibrating body.

FIG. 12 is a block diagram showing the structure of the second piezoelectric actuator assembly in accordance with Embodiment 1 to which the present invention is applied.

The second piezoelectric actuator assembly comprises a first support member or vibrating body plate 13 having vibrating bodies 3 each including a piezoelectric body 1 and a vibrator 2, a second support member or moving body plate 15 having moving bodies 4 for making contact with the vibrating bodies 3 to move them, and a third support member or pressure application member plate 16 having pressure application members 5 for applying appropriate pressure to the vibrating bodies 3 and to the moving bodies 4. The vibrators 2 have connector portions 8 at vibrational nodes of the vibrating bodies 3, the connector portions 8 being adapted to be severed. The connector portions 8 are cut by dicing technology or other technology to separate the individual piezoelectric actuators. Thus, plural piezoelectric actuators having stable driving characteristics including rotation and torque are manufactured.

Figure 4:
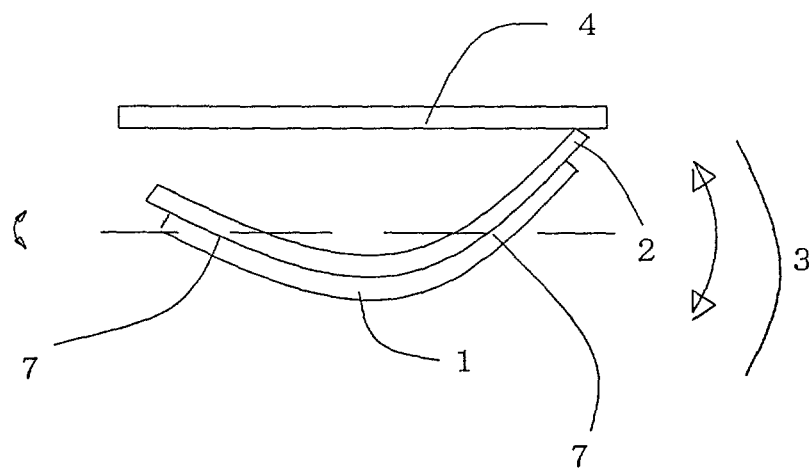
FIG. 4 is a side elevation illustrating a method of driving a piezoelectric actuator.

FIG. 4 is a side elevation illustrating the vibrational pattern of the vibrating body 3 in accordance with Embodiment 1 of the invention.

The vibrating body 3 comprises a vibrator 2 and a piezoelectric body 1, the vibrator 2 being constructed of a resilient material. The vibrating body 3 is excited into resonance by applying an exciting signal having the same frequency as the natural frequency of the vibrating body 3 to the piezoelectric body 1. The vibrating body 3 makes contact with the moving body 4 to move the moving body 4 by a frictional force. A sinusoidal wave, triangular wave, a square wave, or other wave is used as the exciting signal. The vibrational pattern has an antinode and nodes 7. At the antinode, the vibrating body 3 is displaced greatly. However, at the nodes 7, the displacement is 0. Thus, it can be seen that a great force can be given to the moving body 4 by contact at the antinode of vibration. At the vibrational nodes 7, the displacement is 0 and so almost no force is given to the moving body 4.

Figure 1:
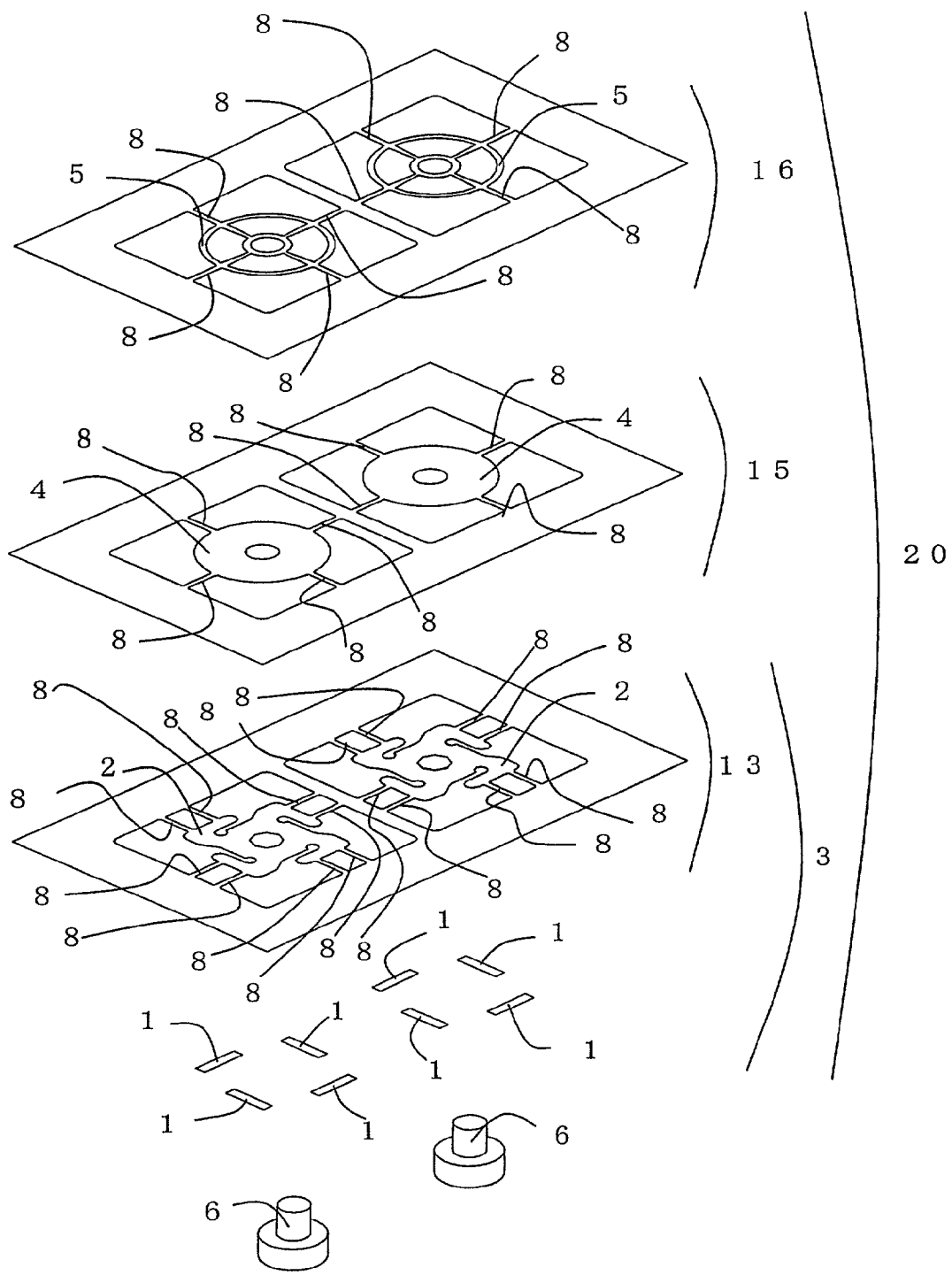
FIG. 1 is a view of a lamination of a pressure application member plate, a moving body plate, and a vibrating body plate constituting a second piezoelectric actuator assembly in accordance with Embodiment 1 to which the present invention is applied.
Figure 2:
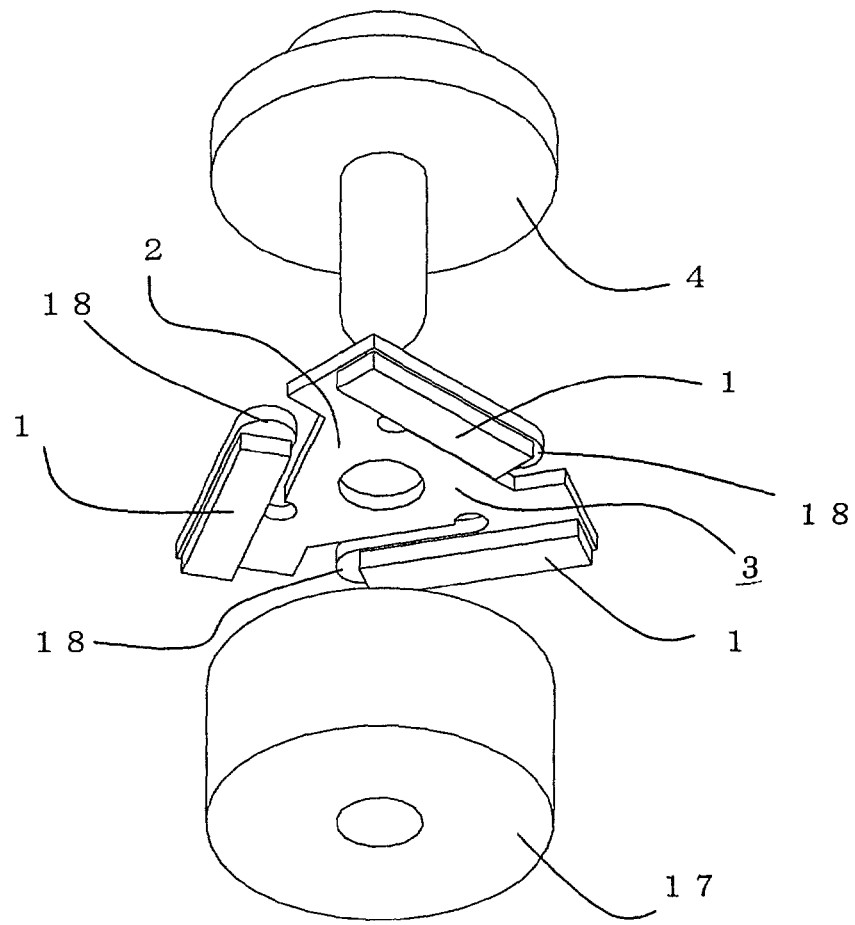
FIG. 2 is a view showing the structure of the related art piezoelectric actuator.
Figure 3:
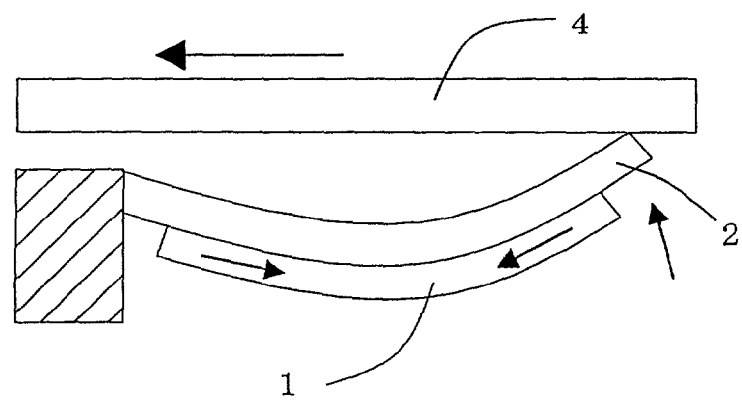
FIG. 3 is a side elevation of a vibrating body.

FIG. 1 shows a lamination of a pressure application member plate 16, a moving body plate 15, and a vibrating body plate 13, constituting a second piezoelectric actuator assembly 20 in accordance with Embodiment 1 to which the present invention is applied.

The piezoelectric actuator comprises the vibrating body 3 having the piezoelectric body 1 mounted to the vibrator 2, the moving body 4 for making contact with the vibrating body 3 to thereby move it, the pressure application member 5 for applying appropriate pressure to the vibrating body 3 and to the moving body 4, and a guide member 6 for connecting together the vibrating body 3, the moving body 4, and the pressure application member 5. The vibrating body 3 has one stationary portion whose one end is fixed and supported and an extension portion extending in the direction of movement of the moving body 4.

Piezoelectric actuators are manufactured in the manner described below. The second piezoelectric actuator assembly 20 constructed of a lamination of the pressure application member plate 16, the moving body plate 15, and the vibrating body plate 13 is cut at the connector portions 8 at once. Thus, a large number of piezoelectric actuators can be manufactured in one process step. Consequently, the efficiency of the fabrication process can be improved.

When the pressure application member plate 16, the moving body plate 15, and the vibrating body plate 13 are stacked on top of each other, the guide member 6 for guiding the direction of movement of the moving body 4 may also be simultaneously mounted.

When the pressure application member plate 16, the moving body plate 15, and the vibrating body plate 13 are simultaneously cut by dicing technology or other technology, it is desired to use a sealant or any other fixing means, taking account of the stress induced by the cutting. However, where the cutting operation is performed without involving stress as in laser processing, the cutting operation may be effected without using any fixing means.

Figure 9:
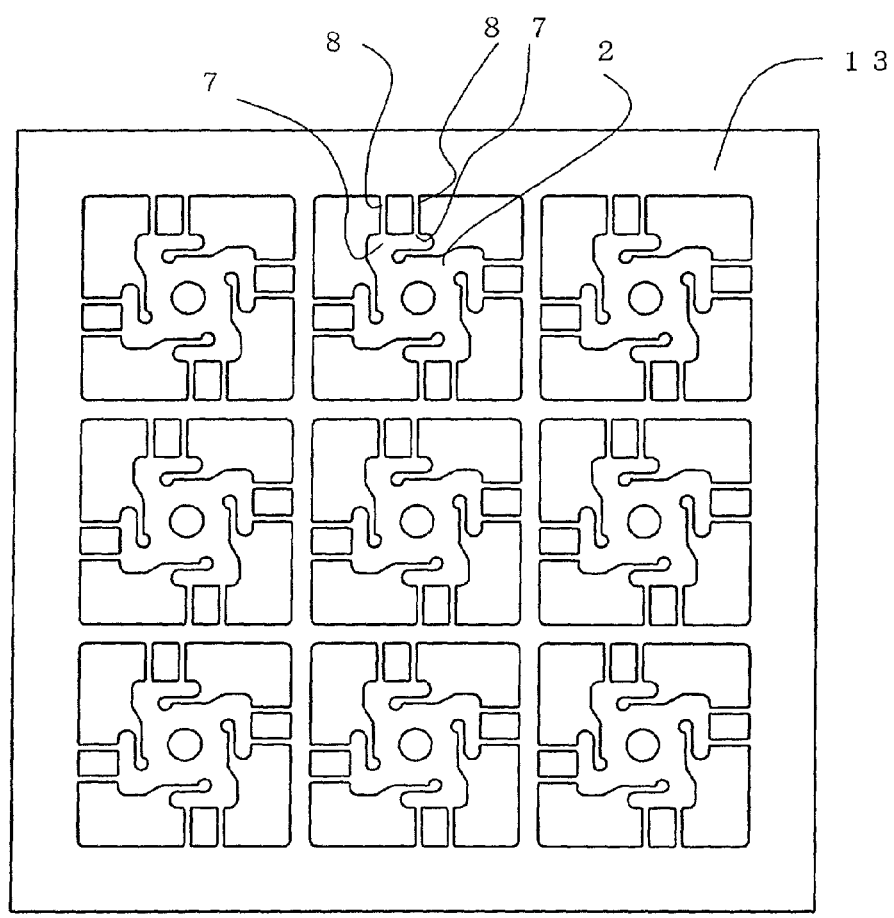
FIG. 9 is a top plan view of one example of a vibrating body plate of a piezoelectric actuator in accordance with Embodiment 1.

FIG. 9 is a top plan view of one example of the vibrating body plate of the piezoelectric actuator. The vibrating body plate 13 has nine vibrators 2 arranged in 3 rows and 3 columns, for example. Each vibrator 2 is connected with the vibrating body plate 13 through connector portions 8 at the vibrational node 7 of the vibrating body. During actual driving, the displacement is 0 at the vibrational node 7 of the vibrator 2. Therefore, after cutting, even if a slight amount of burr is produced, the operation to drive the moving body 4 will not be affected.

The position of the vibrational node is determined by previously fabricating only the vibrating body and measuring the displacement with a laser displacement meter or the like, or the position is estimated by finite element analysis or other method and then the positions of the connector portions 8 are designed.

In the present embodiment, the vibrators 2 are arranged in 3 rows and 3 columns. The number of the vibrators can be easily adjusted according to the design. That is, an appropriate number of vibrators can be fabricated according to the fabrication requirements.

As described thus far, a multiplicity of vibrating bodies can be built into the vibrator body plate. Thus, the number of vibrating bodies that can be fabricated at a time can be adjusted. Hence, piezoelectric actuators can be manufactured efficiently.

Figure 5:
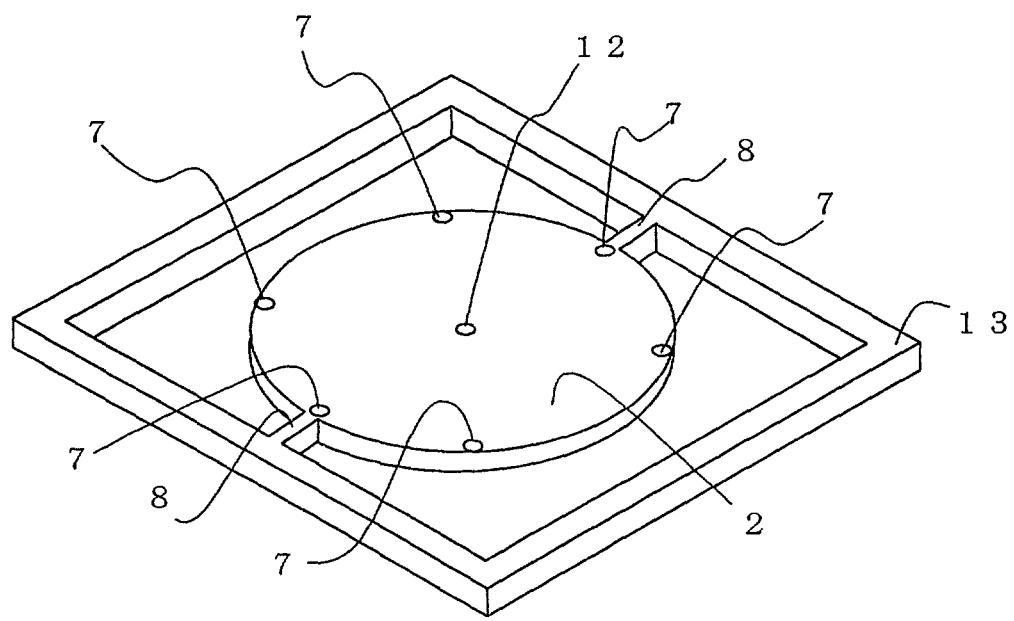
FIG. 5 is a view showing the vibrational pattern of a disc-like vibrating body in a piezoelectric actuator in accordance with Embodiment 1.
Figure 6:
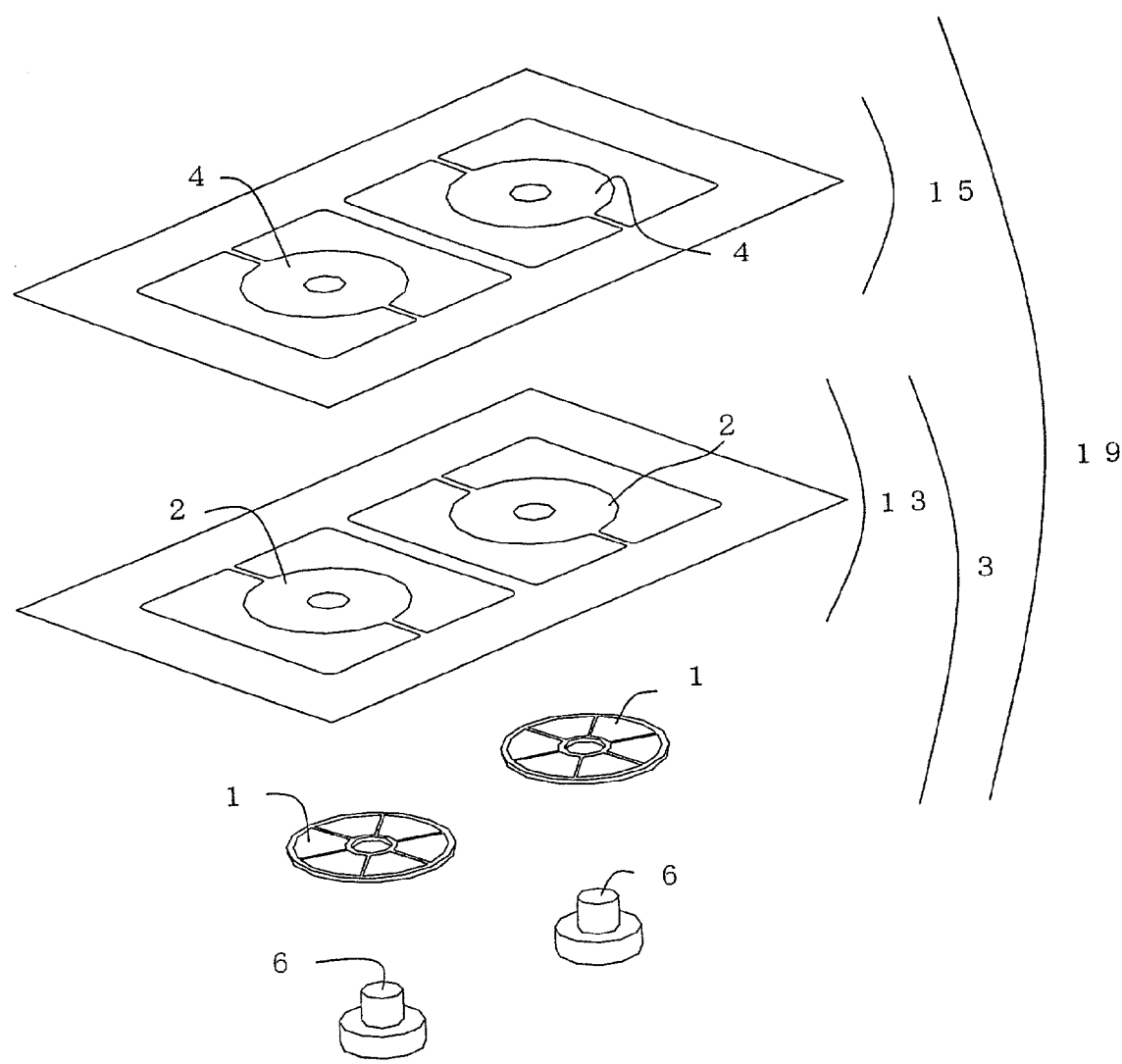
FIG. 6 is a view of a lamination of a pressure application member plate, a moving body plate, and a vibrating body plate constituting a first piezoelectric actuator assembly in accordance with Embodiment 1 to which the present invention is applied.

Similarly, a method of fabricating piezoelectric actuators using disc-like vibrating bodies is described by referring to FIGS. 5 and 6.

FIG. 5 is a view of a vibrator plate of a disc-like vibrator in a piezoelectric actuator in accordance with Embodiment 1 to which the present invention is applied. In this example, a disc is vibrated such that six vibrational nodes are produced circumferentially. The vibrator is connected with a vibrator plate 13 at connector portions 8. The center portion is a stationary portion 12 where motions and rotation are inhibited in every direction (i.e., there are no degrees of freedom). The six vibrational nodes 7 are circumferentially equally spaced from each other by 60°. Where connector portions to be severed are formed, for example, they are formed at any ones of the vibrational nodes 7.

FIG. 6 is a view showing a lamination of a moving body plate 15 and a vibrating body plate 13, constituting a first piezoelectric actuator assembly 19 in accordance with Embodiment 1 to which the present invention is applied.

Each piezoelectric actuator comprises a vibrating body 3 in which piezoelectric body 1 is adhesively bonded to or coupled to a vibrator 2, a moving body 4 for making contact with the vibrating body 3 to move it, a pressure application member 5 for applying appropriate pressure to a vibrating body 3 and to the moving body 4, and a guide member 6 for guiding the direction of movement of the moving body 4 and connecting together the vibrating body 3, the moving body 4, and the pressure application member 5. The vibrating body 3 is excited into resonance to move the moving body by applying an exciting signal having the same frequency as the natural frequency of the vibrating body 3 to the piezoelectric body 1. The vibrating body 3 may have a protrusion or the like to augment the excitation force and to control the direction of excitation.

Each vibrator 2 has connector portions 8 connected with the vibrating body plate 13. The connector portions 8 are located at vibrational nodes (not shown) of the vibrating body 3. Therefore, if burr is produced by a cutting operation employing dicing technology or other technology, the vibration of the vibrating body 3 is not affected. The moving body 4 can be driven with desired characteristics.

Figure 7:
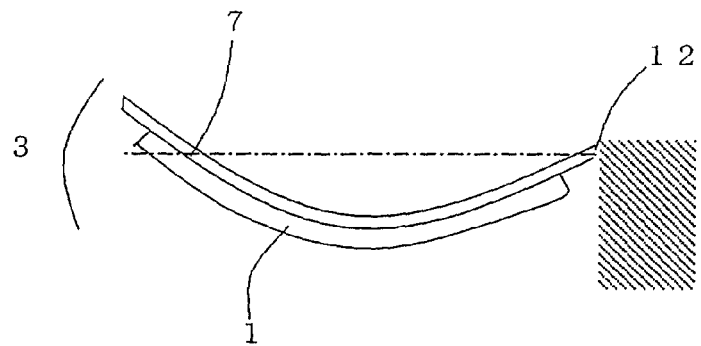
FIG. 7 is a side elevation of a vibrating body of a piezoelectric actuator in accordance with Embodiment 1.

FIG. 7 is a side elevation showing the vibrational pattern of a vibrating body 3 in accordance with an embodiment to which the present invention is applied.

One end of the vibrating body 3 is restricted by a stationary portion 12, while the other end is free. The vibrational node 7 shows a node of the second-order vibrational mode. A connector portion that is connected with the vibrating body plate and to be severed is formed at the vibrational node 7.

Figure 8:
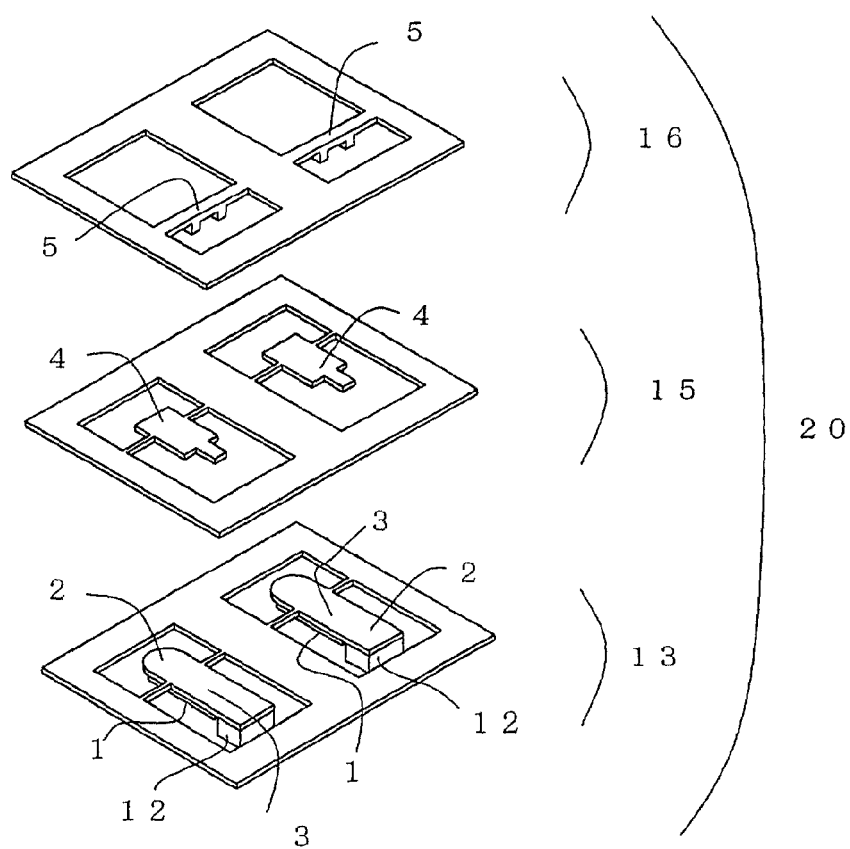
FIG. 8 is a view of a lamination of a pressure application member plate, a moving body plate, and a vibrating body plate constituting a second piezoelectric actuator assembly in accordance with Embodiment 1 to which the present invention is applied.

FIG. 8 is a view of a lamination of a pressure application member plate 16, a moving body plate 15, and a vibrating body plate 13, constituting a second piezoelectric actuator assembly 20 in accordance with Embodiment 1 to which the present invention is applied.

This shows the structure of the second piezoelectric actuator assembly 20, for example, making use of the second-order vibrational mode of the vibrating body 3 whose one end is fixed while the other end is free as shown in FIG. 7.

The second piezoelectric actuator assembly comprises a vibrating body plate 13 in which plural vibrating bodies 3, each being constructed of a piezoelectric body 1 and a vibrator 2 are arrayed, a moving body plate 15 in which plural moving bodies 4 for making contact with the vibrating bodies 3 and moving them are arrayed, a pressure application member plate 16 in which plural pressure application members 5 for applying appropriate pressure to the vibrating bodies 3 and to the moving bodies 4 are arrayed, and stationary portions 12 for fixing the vibrating bodies 3. After stacking the vibrating body plate 13, the moving body plate 15, and the pressure application member plate 16 on top of each other, the connector portions 8 formed at the vibrational nodes 7 of the vibrating bodies 3 and connected with the vibrating body plate 13 are cut. At the same time, the connector portions 8 connecting together the moving bodies 4 and the moving body plate 15 and the connector portions 8 connecting together the pressure application members 5 and the pressure application member plate 16 can be separated by a cutting operation making use of dicing technology, for example. Thus, individual piezoelectric actuators can be manufactured at the same time. The moving bodies 4 make rectilinear motion parallel to the longitudinal direction of the vibrating bodies 3.

The vibrator 2 is connected with the vibrating body plate 13. Since the connector portions 8 adapted for a cutting operation are formed at the vibrational nodes 7, if burr is created by the cutting operation employing dicing technology, for example, the vibration of the vibrating bodies 3 is not affected. The moving bodies 4 can be driven with desired characteristics. Because plural piezoelectric actuators can be fabricated at the same time, the efficiency of fabrication is improved.

As described thus far, in the method of manufacturing piezoelectric actuators in accordance with the present Embodiment 1, the first piezoelectric actuator assembly constructed of a lamination of the moving body plate having connector portions at vibrational nodes of vibrating bodies and equipped with plural moving bodies and the vibrating body plate equipped with plural vibrating bodies is separated into individual actuators by a separating operation making use of dicing technology, for example. In this way, a multiplicity of piezoelectric actuators having uniform quality can be manufactured at the same time.

In a method of manufacturing piezoelectric actuators in accordance with the present Embodiment 1, the second piezoelectric actuator assembly constructed of a lamination of a pressure application member plate having connector portions formed at vibrational nodes of vibrating bodies and equipped with plural pressure application members, the moving body plate equipped with plural moving bodies, and the vibrating body plate equipped with plural vibrating bodies is separated into individual actuators by a separating operation making use of dicing technology, for example. In this way, a multiplicity of piezoelectric actuators having uniform quality can be manufactured at the same time.

It is to be noted that the number and positions of nodes of vibrating bodies vary according to vibrational mode. The present invention can also be applied to piezoelectric actuators having different vibrational modes.

Notice also that vibrational nodes are not always required to be equal in number with connector portions.

Second Embodiment

Figure 10:
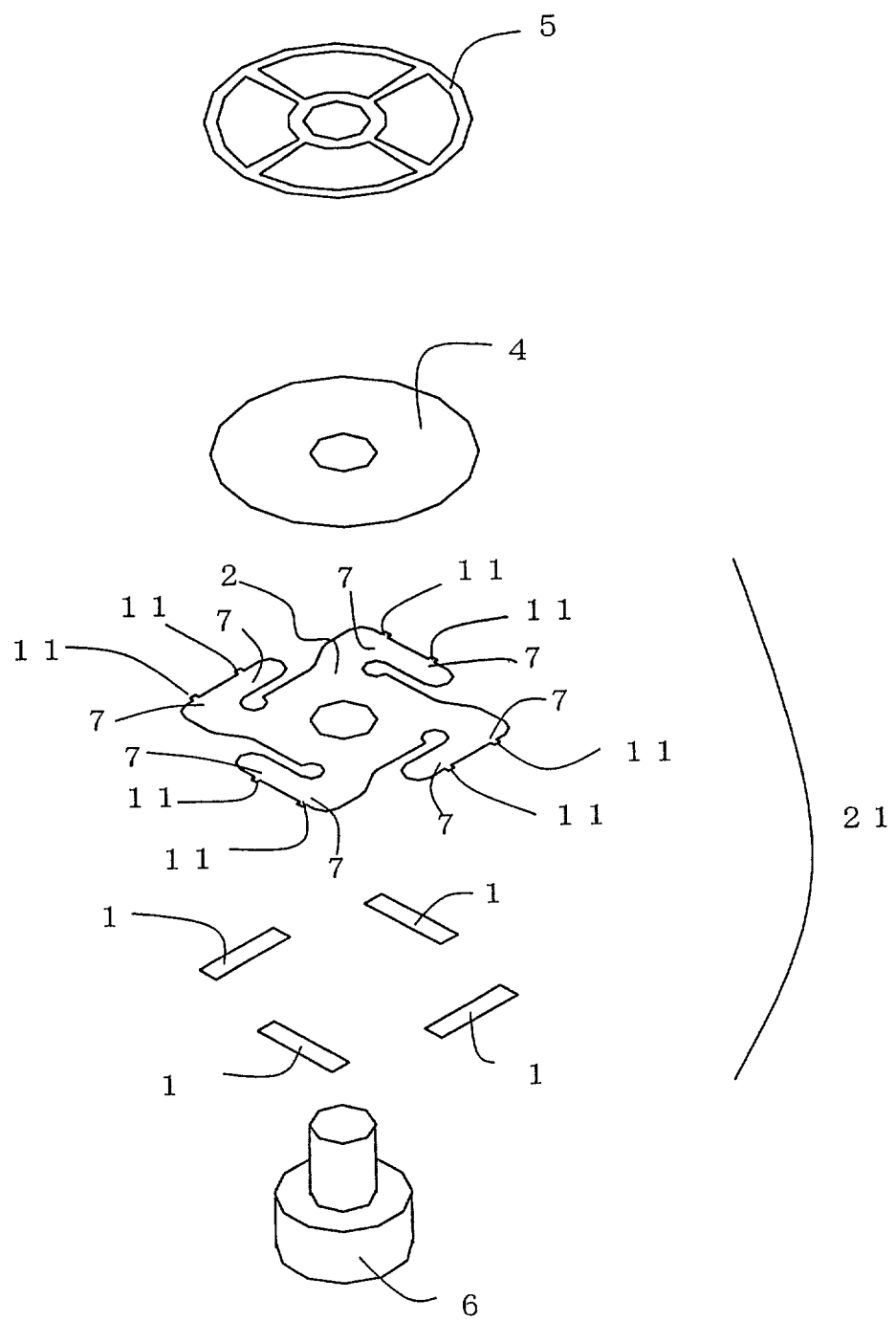
FIG. 10 is a view showing the structure of a piezoelectric actuator in accordance with Embodiment 2.

Embodiment 2 of the present invention is described in detail by referring to FIGS. 10 and 11.

In Embodiment 2, an example of fabrication step is given in which vibrating bodies are cut from a vibrating body plate at vibrational nodes, and then the vibrating bodies, moving bodies, and pressure application members (if necessary) are stacked on top of each other.

FIG. 10 shows the structure of a piezoelectric actuator in accordance with Embodiment 2. The piezoelectric actuator comprises a piezoelectric vibrating body 21 having a vibrator 2 stuck to a piezoelectric body 1, a moving body 4 for making contact with a vibrating body 3 to move it, a pressure application member 5 for applying appropriate pressure to the vibrating body 3 and to the moving body 4, and a guide member 6 for guiding the direction of movement of the moving body 4. The vibrator 2 shown in FIG. 10 has been already cut off at the connector portions formed at vibrational nodes 7 of the vibrators 2 shown in FIG. 9. It is observed that minute burrs 11 are formed.

The piezoelectric vibrating body 21 is excited into resonance by applying an exciting signal having the same frequency as the natural frequency of the piezoelectric vibrating body 21 to the piezoelectric body 1. The piezoelectric vibrating body 21 makes contact with the moving body 4 to thereby drive it. Although the vibrators 2 have minute burrs 11, these are located at vibrational nodes 7 of the piezoelectric vibrating body 21 and thus are different from those which touch the moving body 4. Therefore, the operation of the moving body is not affected. That is, a piezoelectric actuator that can be excited stably can be manufactured.

FIG. 11 is a view illustrating fabrication of vibrating bodies and piezoelectric vibrating bodies in accordance with Embodiment 2.

Figure 11A:
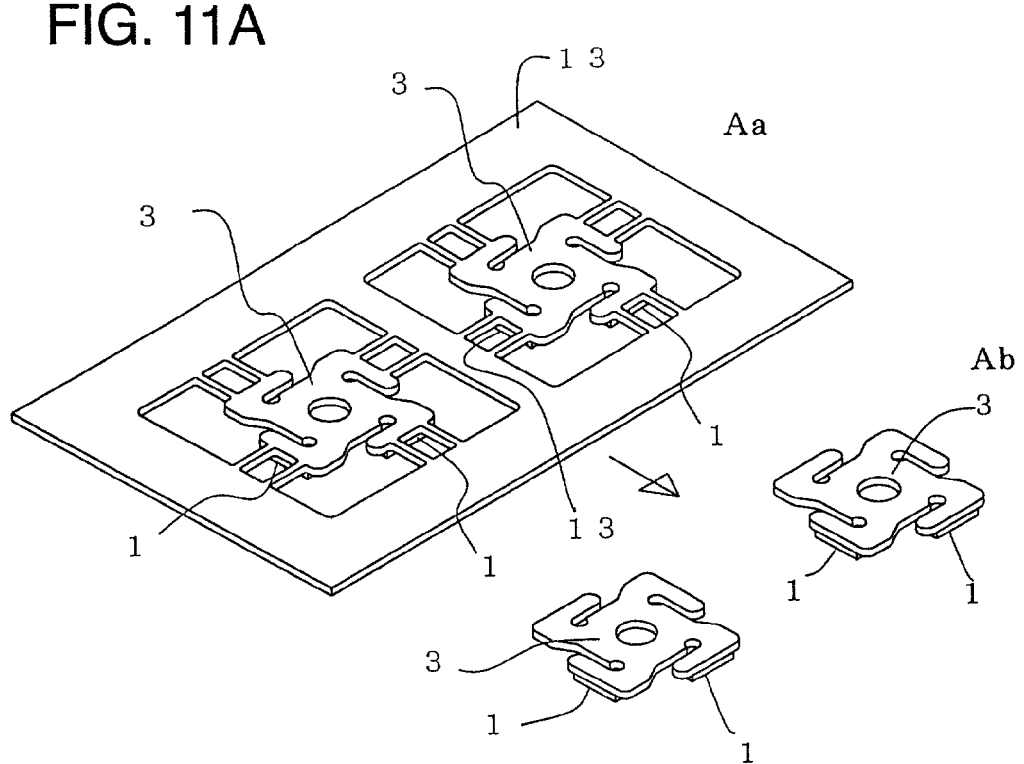
FIG. 11 is a view illustrating fabrication of vibrating bodies and piezoelectric vibrating bodies in accordance with Embodiment 2.

FIG. 11A is a fabrication view of vibrating bodies, and in which FIG. 11Aa shows the state of a vibrating body plate 13 prior to a cutting operation. Before the cutting, vibrating bodies 3 on which piezoelectric bodies 1 are stuck are continuous with the vibrating body plate 13 at connector portions formed at vibrational nodes of the vibrating bodies 3. FIG. 11Ab shows the situation of the vibrating bodies 3 after the cutting. Since the piezoelectric bodies 1 are stuck on the vibrating bodies 3 before the cutting, the vibrating bodies 3 can be taken out after the cutting. Then, they are stacked together with moving bodies (not shown), whereby piezoelectric actuators can be fabricated. Since the vibrational nodes are severed, the amplitude of the vibration is not affected. Piezoelectric actuators having stable driving characteristics can be fabricated.

Figure 11B:
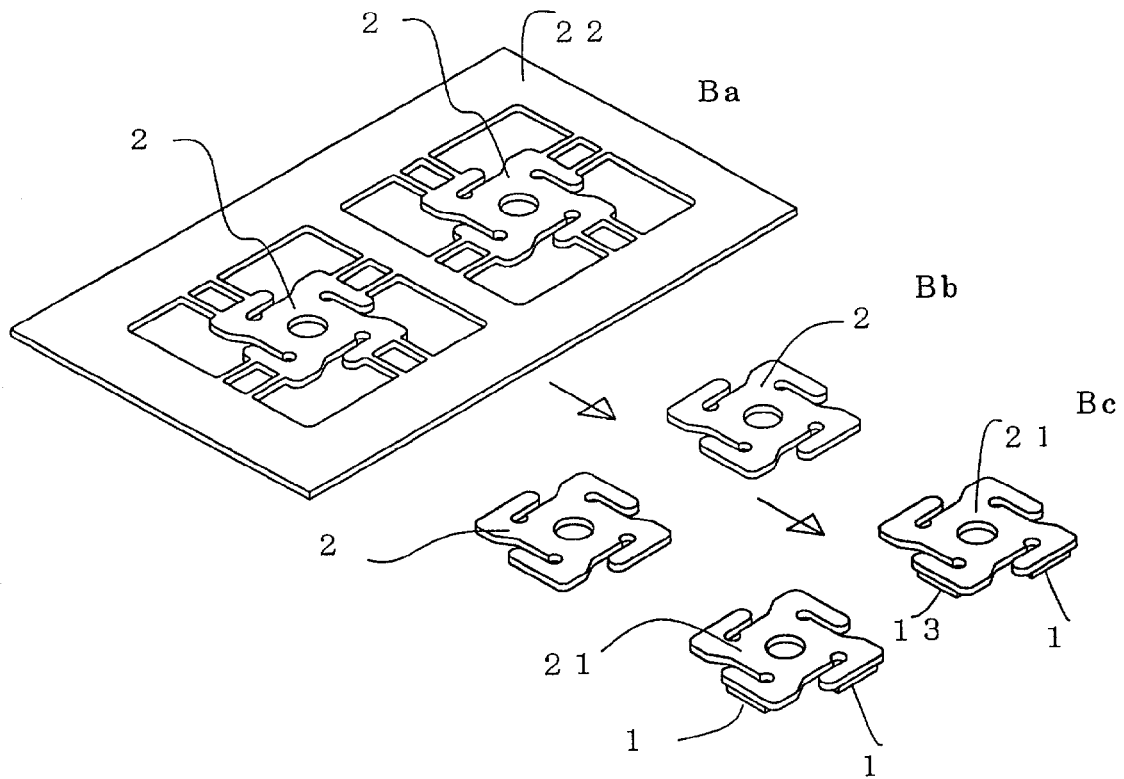

FIG. 11B illustrates the fabrication of a piezoelectric vibrating body. A vibrator plate 22 shown at Ba of FIG. 11B is provided with plural vibrators 2. These vibrators 2 are connected with the vibrator plate 22 at connector portions that are at vibrational nodes of the piezoelectric vibrating body 21 in a manner not illustrated. Bb of FIG. 11B shows the vibrators 2. This shows the manner in which the vibrator plate 22 shown at Ba is cut to take out the vibrators 2. Bc of FIG. 11B shows the manner in which piezoelectric bodies 1 are stuck on the vibrators 2 at Bb to constitute piezoelectric vibrating bodies 21. Then, the piezoelectric vibrating bodies 21 and moving bodies (not shown) are stacked on top of each other to fabricate piezoelectric actuators. Since the vibrational nodes are cut at this time, the amplitude of the vibration is not affected. Piezoelectric actuators having stable driving characteristics can be manufactured.

As described thus far, in the method of manufacturing piezoelectric actuators in accordance with Embodiment 2, piezoelectric vibrating bodies cut at connector portions formed at vibrational nodes and connected with the vibrating body plate, the pressure application members, and the moving bodies are stacked on top of each other to constitute piezoelectric actuators. Thus, piezoelectric actuators with stable driving characteristics can be manufactured. As shown in Embodiment 1, a multiplicity of piezoelectric actuators can be manufactured at the same time by cutting off individual piezoelectric actuators by making use of dicing technology, for example, from a piezoelectric actuator assembly that is a lamination of a pressure application member plate having plural pressure application members, a moving body plate having plural moving bodies, and a vibrating body plate having plural vibrating bodies. In contrast with this, piezoelectric actuators according to Embodiment 2 are adapted for manufacture of a single actuator.

As described thus far, in the method of manufacturing piezoelectric actuators in accordance with the present invention, a vibrating body plate having at least one vibrating body having a resilient body to which a piezoelectric body is stuck and a moving body plate having at least one moving body are stacked on top of each other to constitute a piezoelectric actuator assembly. This piezoelectric actuator assembly is cut into individual piezoelectric actuators, thus taking out the piezoelectric actuators.

In this method, the moving body and the vibrating body are stacked on top of each other to constitute the piezoelectric actuator assembly. The piezoelectric actuator assembly is cut into individual piezoelectric actuators by making use of dicing technology or other technology. Consequently, a large number of piezoelectric actuators can be fabricated at a time. Hence, the efficiency of the manufacture can be enhanced.

Furthermore, a vibrating body plate having at least one vibrating body having a resilient body to which a piezoelectric body is stuck, a moving body plate having at least one moving body, and a pressure application plate having at least one pressure application member for applying pressure to the vibrating body and to the moving body are stacked on top of each other to thereby constitute a piezoelectric actuator assembly. This piezoelectric actuator assembly is cut into individual piezoelectric actuators. Thus, the piezoelectric actuators are taken out.

Since the pressure application member is used, it is possible to apply appropriate pressure to the moving body and to the vibrating body. Hence, piezoelectric actuators with stable driving speed and driving force can be fabricated.

Because the aforementioned vibrating body is supported from the vibrating body plate at vibrational nodes of the vibrating body, the aforementioned cutting operation severs the vibrational nodes.

By cutting the piezoelectric actuator assembly by utilizing dicing technology or other technology, a multiplicity of piezoelectric actuators can be fabricated in one operation.

The efficiency of manufacture can be improved. In addition, if slight burrs or dropouts are produced on or in the vibrating body by the cutting operation making use of dicing technology or the like, the burrs are produced at the vibrational nodes of the vibrating body and so the vibrational pattern of the vibrating body is not affected. That is, the operation of the moving body contacted with the vibrating body is not affected. Therefore, stable piezoelectric actuators can be manufactured.

In a method, a vibrating body plate is prepared which has at least one vibrating body and a resilient material to which a piezoelectric body is stuck. The vibrating body plate is connected with connector portions formed at vibrational nodes of the vibrating body. The vibrating body is separated from the vibrating body plate. The vibrating body and the moving body are stacked on top of each other, thus manufacturing a piezoelectric actuator.

As such, where a few number of piezoelectric actuators are fabricated as well as where batch processing making use of dicing technology is carried out, if slight burrs or dropouts are produced on or in the vibrating body by a cutting operation exploiting dicing technology, the vibrational pattern of the vibrating body is not affected, because the burrs are produced at the vibrational nodes of the vibrating body. That is, the operation of the moving body contacted with the vibrating body is not affected. Therefore, desired piezoelectric actuators can be manufactured.

Additionally, a vibrator plate having at least one vibrating body constructed of a resilient material to which a piezoelectric body is stuck is prepared. The vibrating body plate is connected with connector portions formed at vibrational nodes of the vibrating body. The vibrating body is separated from the vibrating body plate. The vibrating body, the moving body, and a pressure application member for applying pressure to the vibrating body and to the moving body are stacked on top of each other. In this way, piezoelectric actuators are fabricated.

In this method, the pressure application member is used and so appropriate pressure can be applied to both moving body and vibrating body. Piezoelectric actuators with stable driving speed and driving force can be manufactured.

Additionally, a vibrating body plate having at least one vibrator constructed of a resilient material is connected with the vibrator at connector portions formed at vibrational nodes of a vibrating body formed where a piezoelectric body is stuck to the vibrator. The vibrator is separated at the connector portions. The vibrating body constructed of the vibrator to which the piezoelectric body is stuck is formed. The vibrating body and the moving body are stacked on top of each other. In this way, a piezoelectric actuator is manufactured.

As such, where a few number of piezoelectric actuators are fabricated as well as where batch processing making use of dicing technology is carried out, if slight burrs or dropouts are produced on or in the vibrating body by a cutting operation exploiting dicing technology, the vibrational pattern of the vibrating body is not affected, because the burrs are produced at the vibrational nodes. That is, the operation of the moving body contacted with the vibrating body is not affected. Therefore, desired piezoelectric actuators can be manufactured.

Yet additionally, a vibrator plate having at least one vibrator and containing a resilient material is connected with the vibrator at connector portions formed at the positions of vibrational nodes of a vibrating body constructed of the vibrator to which a piezoelectric body is stuck. Piezoelectric actuators are manufactured by separating the vibrator at the connector portions, forming the vibrating body constructed of the vibrator to which the piezoelectric body is stuck, and stacking the vibrating body, the moving body, and a pressure application member for applying pressure to the vibrating body and to the moving body on top of each other.

With this fabrication method, appropriate pressure force can be applied to the moving body and to the vibrating body, because the pressure application member is used. Piezoelectric actuators having stable driving speed and driving force can be manufactured.

A piezoelectric actuator comprising a vibrating body having a stationary portion whose one end is fixed and supported and an extension portion extending in the direction of movement of the moving body, the aforementioned moving body contacted with the vibrating body to move it, and a pressure application member for applying pressure to the vibrating body and to the moving body is manufactured by any one of the fabrication methods described above.

Since the piezoelectric actuator comprising a vibrating body having a stationary portion whose one end is fixed and supported and an extension portion extending in the direction of movement of the moving body, the aforementioned moving body contacted with the vibrating body to move it, and a pressure application member for applying pressure to the vibrating body and to the moving body is manufactured by any one of the fabrication methods described above. Therefore, a multiplicity of piezoelectric actuators can be manufactured in one process step. Consequently, they can be manufactured efficiently.

As can be understood from the description provided thus far, the present invention makes it possible to manufacture piezoelectric actuators driven stably and having desired driving characteristics in large quantities at low cost.

What is claimed is:

1. A method of manufacturing piezoelectric actuators, comprising the steps of:
    forming a vibrating body plate supporting a plurality of vibrating bodies at vibrational nodes thereof, each of the vibrating bodies having a vibrator and a piezoelectric body mounted on the vibrator;
    forming a moving body plate having moving bodies;
    stacking the vibrating body plate and the moving body plate over one another to provide a piezoelectric actuator assembly; and
    cutting the piezoelectric actuator assembly at the vibrational nodes of the vibrating bodies to provide a plurality of individual piezoelectric actuators.

2. A method according to claim 1; wherein each of the vibrators is made of a resilient material.

3. A method of manufacturing piezoelectric actuators, comprising the steps of:
    forming a vibrating body plate supporting a plurality of vibrating bodies at vibrational nodes thereof, each of the vibrating bodies having a vibrator and a piezoelectric body mounted on the vibrator;
    forming a moving body plate having moving bodies;
    forming a pressure application plate having a pressure application member for applying pressure to the vibrating bodies of the vibrating body plate and to the moving bodies of the moving body plate;
    stacking the vibrating body plate, the moving body plate, and the pressure application plate over one another to provide a piezoelectric actuator assembly; and
    cutting the piezoelectric actuator assembly at the vibrational nodes of the vibrating bodies to provide a plurality of individual piezoelectric actuators.

4. A method according to claim 3; wherein each of the vibrators is made of a resilient material.

5. A method of manufacturing piezoelectric actuators, comprising the steps of:
   providing a first support member supporting at least two vibrational bodies at vibrational nodes thereof, each of the vibrational bodies having a vibrator and a piezoelectric body mounted on the vibrator;
   providing a second support member supporting at least two movable bodies;
   stacking the first and second support members over one another to provide a piezoelectric actuator assembly having each of the movable bodies disposed over a respective one of the vibrators; and
   cutting the piezoelectric actuator assembly at the vibrational nodes of the vibrational bodies to form the piezoelectric actuators.

6. A method according to claim 5; wherein each of the vibrators is made of a resilient material.

7. A method according to claim 5, further comprising the step of providing a third support member having at least two pressure application members each for applying pressure to respective ones of the vibrators and the movable bodies; and wherein the stacking step comprises stacking the first, second and third support members over one another to provide the piezoelectric actuator assembly.

8. A method according to claim 5; wherein each of the vibrators is generally disc-shaped.

9. A method according to claim 8; wherein the first support member supports each of the vibrational bodies at two vibrational nodes thereof.

10. A method of manufacturing a piezoelectric actuator, comprising the steps of:
    providing a support member having connector portions connected to a vibrational body at vibrational nodes thereof, the vibrational body having a vibrator and a piezoelectric body mounted on the vibrator for vibrating the vibrator;
    separating the vibrational body from the support member by cutting the connector portions of the support member;
    disposing a movable body in contact with the vibrator of the vibrational body for undergoing movement in accordance with vibration of the vibrator; and
    providing a pressure application member for biasing the movable body into pressure contact with the vibrator.

11. A method according to claim 10; further comprising a guide member for guiding a direction of movement of the movable body.

12. A method according to claim 10; wherein the vibrator is made of a resilient material.

* * * * *